United States Patent
Arnett et al.

[11] 3,897,810
[45] Aug. 5, 1975

[54] SEALED FLUID COUPLING

[75] Inventors: Lawrence E. Arnett, Wayne; William G. Roven, Southgate, both of Mich.

[73] Assignee: Ford Motor Company, Dearborn, Mich.

[22] Filed: July 5, 1973

[21] Appl. No.: 376,642

[52] U.S. Cl. ............ 141/346; 141/349; 251/149.2; 285/360
[51] Int. Cl.² .......................................... B65B 3/18
[58] Field of Search ............ 141/52, 59, 93, 97, 207, 141/154, 208, 223, 290–295, 301, 310, 329, 367, 382–388, 392, 346–350; 220/24.5, 40 R, 86 R; 251/149.1–149.6; 285/337, 338, 360, 361, 376, 401

[56] References Cited
UNITED STATES PATENTS

| | | | |
|---|---|---|---|
| 2,908,299 | 10/1959 | Gosselin | 141/290 X |
| 3,566,928 | 3/1971 | Hansel | 141/392 X |
| 3,695,648 | 10/1972 | Marosy | 285/338 X |
| 3,730,216 | 5/1973 | Arnett et al. | 251/149.2 X |

*Primary Examiner*—Richard E. Aegerter
*Assistant Examiner*—Frederick R. Schmidt
*Attorney, Agent, or Firm*—Roger E. Erickson; Keith L. Zerschling

[57] ABSTRACT

Coupling apparatus suitable for use as part of a combination fuel delivery-vapor recovery system for filling automobile fuel tanks. The apparatus includes an orifice member attached to the inlet pipe of the fuel tank having one or more recesses in the periphery of its orifice which are positioned to correspond with tab means extending radially outwardly from the nozzle spout. The orifice member also includes one or more cam surfaces engageable with the tab means when the nozzle spout is received within the orifice member and the tab means have passed through the recesses. Rotation of the nozzle spout relative to the orifice member causes the tab means to move along the cam surfaces and to compress a resilient seal positioned between a portion of the nozzle assembly and the orifice member.

1 Claim, 4 Drawing Figures

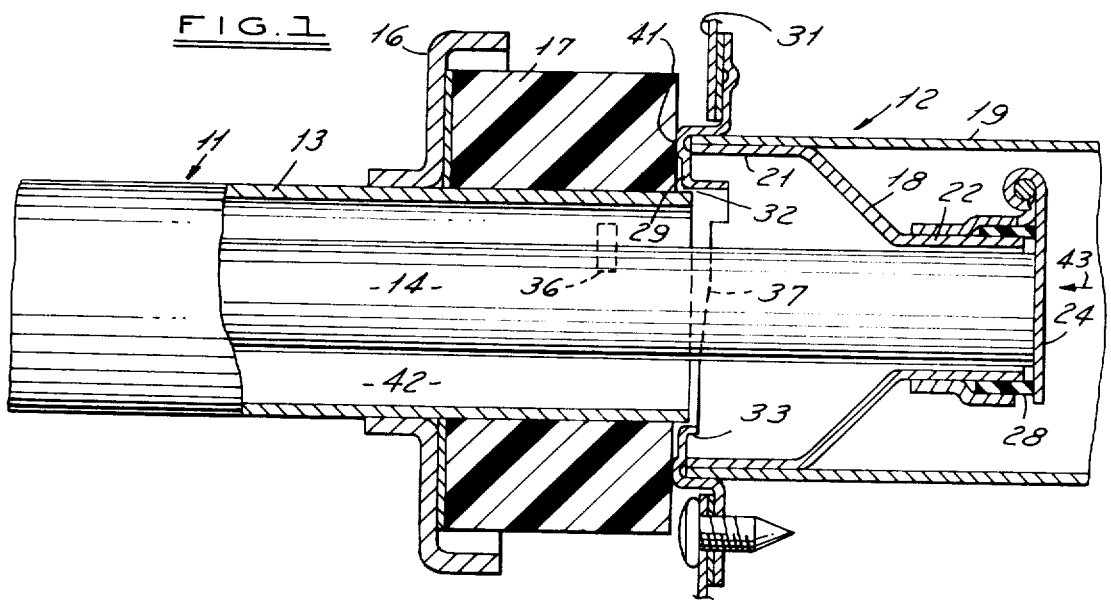
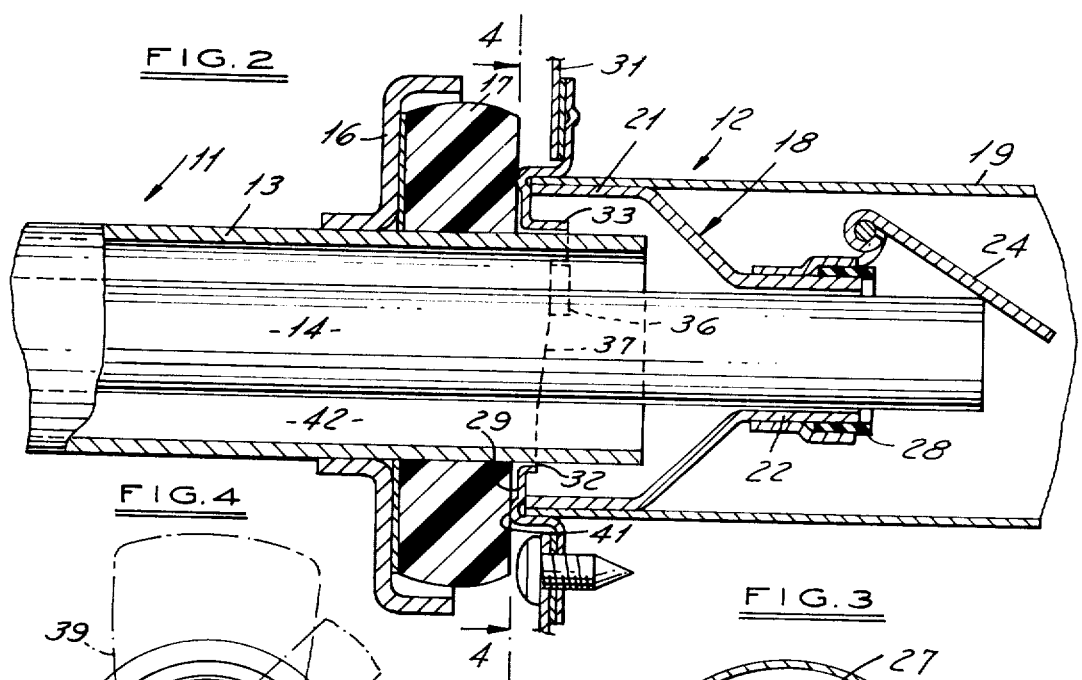
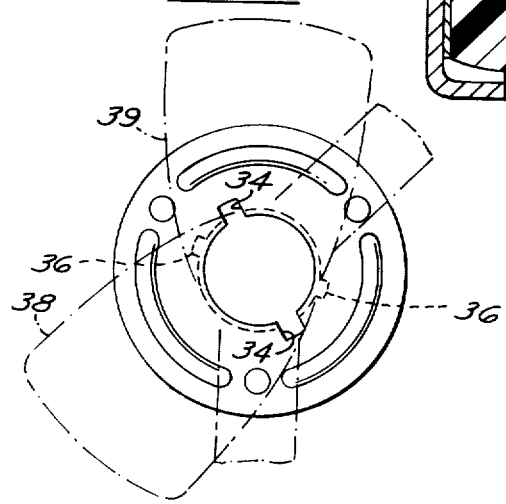
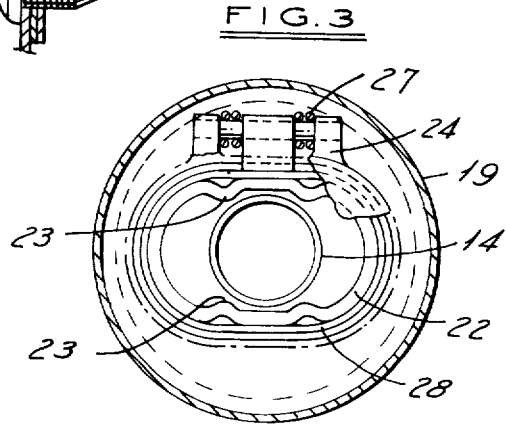

SEALED FLUID COUPLING

BACKGROUND AND SUMMARY OF THE INVENTION

In certain applications, it is desirable when delivering fuel or other volatile liquids to simultaneously recover the vapors escaping from the tank being filled. This invention provides nozzle and inlet apparatus that forms a sealed, tight connection for the simultaneous delivery of liquid and recovery of vapors. In addition, the invention provides a sealed tank inlet when the nozzle is removed from the inlet. The invention also provides a nozzle and inlet combination in which liquid will not be accepted until the nozzle is fully received within the inlet apparatus and a tight seal is effected. The invention further provides means to selectively accept or reject nozzle spouts on the basis of diameter. The invention provides nozzle and tank inlet apparatus which may be used as a vapor recovery fuel delivery system in automotive vehicles without extensive revision to the general automotive fueling procedure. Finally, the invention provides a liquid delivery and vapor recovery system that is economical to produce and reliable in service.

A sealed fluid connector constructed in accordance with this invention includes a male nozzle component and a female inlet component. The nozzle component includes a portion receivable within the inlet for fluid transmission and disengageable for separation from the inlet. The nozzle spout includes at least one radially outwardly extending tab which is registerable with a peripheral recess formed in the inlet to permit the nozzle spout to be received within the inlet insert. A resilient member is engageable with a portion of the nozzle and the inlet to provide a seal when the nozzle is received within the inlet. The inlet includes at least one cam surface engageable with the tab means when the tab means has passed through the peripheral recess and the nozzle is rotated relative to the inlet. The rotation causes increased compression of the resilient seal member between the nozzle and inlet.

BRIEF DESCRIPTION OF THE DRAWINGS

FIG. 1 of the drawings is a cross sectional view of fluid coupling apparatus constructed in accordance with this invention showing the nozzle component partially inserted into the inlet component.

FIG. 2 is a cross sectional view of fluid coupling apparatus in which the nozzle component is fully received within the inlet component.

FIG. 3 is an end elevational view viewed in the direction of arrow 43 of FIG. 1.

FIG. 4 is an elevational view of the inlet member taken along line 4—4 of FIG. 2 and showing a profile of the nozzle assembly in broken line representation.

DETAILED DESCRIPTION OF A PREFERRED EMBODIMENT

The coupling apparatus of the invention includes a male component 11 and a female component 12. In the preferred embodiment, the male component is a fuel pump nozzle whereas the female component is an automotive fuel tank inlet pipe and inlet assembly. The nozzle includes a larger diameter pipe 13 and a concentrically received smaller diameter pipe 14. The smaller diameter pipe extends past the end of the larger diameter pipe a predetermined distance as shown in FIGS. 1 and 2. A collar 16 is secured to the larger diameter pipe at a point spaced from its end and provides an abutment against which is secured an annular resiliently compressible seal member 17. The seal is formed of a highly compressible cellular elastomeric material.

The female component 12 includes an inlet insert 18 having generally a funnel shape secured within the outer end portion of the fuel tank inlet pipe 19. The funnel includes a cylindrical portion 21 contiguous with the inner diameter of the filler pipe and a generally oval downstream portion 22 which includes four axially extending inwardly protruding ridges 23 spaced so as to permit the central reception of the smaller diameter pipe 14 and to preclude its off-center reception.

A door or gate 24 is pivotally attached to the downstream end of the inlet funnel 18. A coil spring 27 biases the door toward a closed position into sealing engagement with a rubber or rubber-like oval lip or seal 28.

The female component 12 includes also a plate 29 attached to the mouth of the inlet pipe 19 and to the vehicle body 31. The plate 29 includes an orifice or opening 32 formed by a downstream extending flange 33. The opening 32 is sufficient in diameter to receive the larger diameter pipe 13. A pair of diametrically opposed notches 34 interrupt the circumference of the opening 32 and flange 33 and are constructed to receive a pair of diametrically opposed tabs 36 extending radially outwardly from the larger diameter pipe 13. The downstream edge 37 of the flange includes a pair of cams or ramps engageable with the back side of the tabs after they have passed through the notches and have been rotated relative to the orifice plate.

To deliver fuel from the nozzle assembly 11 to the inlet pipe 19 of the fuel tank (not shown), the smaller diameter pipe 14 is inserted into the downstream portion of the inlet funnel in a centralized position as shown in FIG. 3. As axial displacement of the nozzle assembly relative to the inlet pipe continues, the larger diameter pipe 13 is received within the orifice 32 of the plate 27. The nozzle tabs 36 must then be aligned with the notches 34 so that further axial displacement of the nozzle is possible. The position in which the notches and tabs are aligned is shown by reference numeral 38 in FIG. 4. When the tabs have passed through the notches, the nozzle assembly may be rotated clockwise to the position shown by the phantom representation 39 in FIG. 4. This rotation causes the tabs 36 to travel along the ramp or cam edges 37 and to be displaced further inwardly in the axial direction so that the seal 17 is further compressed and a tight seal is formed along bead 41 of the plate 29. As shown in FIG. 2, complete insertion of the nozzle assembly into the inlet funnel displaces the gate or door 24 to an open position and permits delivery of fuel to the inlet pipe 19. Vapors displaced by the liquid fuel pass through the downstream portion 22 of the inlet funnel on either side of the liquid delivery pipe 14 and then out through the annular passage 12 between the larger diameter pipe 13 and the smaller diameter pipe 14. The vapors then may be condensed or otherwise accumulated for further use or disposal.

Modifications and alterations will occur to those skilled in the art which are included within the scope of the following claims.

We claim:

1. A fluid coupling for liquid flow in a downstream direction and vapor flow in an upstream direction comprising a male component and a female component, said male component comprising a fuel pump nozzle including a first rigid cylindrical member for the delivery of liquid and a second rigid cylindrical member for the receipt of vapors concentrically positioned about said first member, said first member and said second member having fixed relative positions with said first cylindrical member extending axially past the end of said second cylindrical member, one or more tabs extending radially outwardly from said second member, and resilient seal means fastened about said second member, said female component being positioned within the inlet pipe of an automotive vehicle fuel tank, said female component including an element having an opening of size sufficient to receive said second member, said opening including one or more peripheral recesses corresponding to said one or more tabs to permit the passage of said tabs through said opening, said element including a portion extending axially inwardly from said opening having cam surfaces engageable with said tabs when said tabs are rotated in a given direction relative to said element following passage of said tabs through said recesses, said female component including a generally funnel-shaped insert, said insert including a downstream spout portion having a generally oval shape with a minimum cross sectional dimension of sufficient magnitude to receive said first cylindrical member, and gate means pivotally mounted to the end of said insert spout, said gate means being resiliently biased to close the end of said spout, said gate means being displaceable to an open position by said first cylindrical member being inserted through said insert spout, the end of second member and the seal means being axially spaced upstream of said first member such that said gate means is closed until the second member is received within said female component and the seal means is axially compressed against said female component.

* * * * *